(12) United States Patent
Bledsoe et al.

(10) Patent No.: US 9,537,373 B2
(45) Date of Patent: Jan. 3, 2017

(54) ALTERNATOR FAN (71) Applicant: REMY TECHNOLOGIES, L.L.C., Pendleton, IN (US)

(72) Inventors: Christopher Bledsoe, Anderson, IN (US); Kirk Neet, Pendleton, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 370 days.

(21) Appl. No.: 13/895,941

(22) Filed: May 16, 2013

(65) Prior Publication Data
US 2014/0339964 A1 Nov. 20, 2014

(51) Int. Cl.
*H02K 9/06* (2006.01)

(52) U.S. Cl.
CPC ........................................ *H02K 9/06* (2013.01)

(58) Field of Classification Search
CPC ............... H02K 9/06; H02K 9/04; F04D 1/04
USPC ... 310/60 R, 62, 63; 416/231 B, 219 R, 180, 416/181, 182, 220 R, 238; 29/889.21, 889.7, 28, 29/283, 888.025; 415/209.3; 361/695
See application file for complete search history.

(56) References Cited

U.S. PATENT DOCUMENTS

| | | | | |
|---|---|---|---|---|
| 2,581,872 A * | 1/1952 | Morrison | ................. | F04D 29/34 416/212 R |
| 2,588,175 A * | 3/1952 | Stewart | .................. | H02K 19/22 310/168 |
| 2,654,529 A * | 10/1953 | Smith | ................... | F04D 25/082 29/889.4 |
| 4,686,399 A | 8/1987 | Imori et al. | | |
| 4,826,405 A * | 5/1989 | Robb | ..................... | B21D 53/78 416/204 R |
| 4,961,016 A * | 10/1990 | Peng | ........................ | H02K 9/06 310/59 |
| 5,693,992 A | 12/1997 | Kurusu et al. | | |
| 5,944,497 A | 8/1999 | Kershaw et al. | | |
| 6,462,440 B1 | 10/2002 | Asao et al. | | |
| 6,707,181 B1 * | 3/2004 | Militello et al. | ................ | 310/63 |
| 7,358,630 B2 | 4/2008 | Vasilescu et al. | | |
| 7,365,471 B2 | 4/2008 | Creviston et al. | | |
| 7,385,322 B2 * | 6/2008 | Park | ................................ | 310/61 |
| 8,684,676 B1 * | 4/2014 | Kirkpatrick | ........... | F04D 29/281 415/151 |
| 8,847,446 B2 | 9/2014 | Maley | | |
| 2002/0076341 A1 | 6/2002 | Morelli | | |
| 2003/0042806 A1 | 3/2003 | Inaba et al. | | |
| 2005/0285459 A1 | 12/2005 | Ishida et al. | | |
| 2006/0250033 A1 | 11/2006 | Vasilescu et al. | | |
| 2007/0024131 A1 | 2/2007 | Rouleau et al. | | |
| 2009/0039719 A1 | 2/2009 | Nakamura | | |
| 2011/0229358 A1 | 9/2011 | Streng et al. | | |

(Continued)

OTHER PUBLICATIONS

International Search Report and Written Opinion for PCT Application No. PCT/US2014/038045, dated Sep. 12, 2014, pp. 1-11.

(Continued)

*Primary Examiner* — John K Kim
*Assistant Examiner* — Noli Manaloto
(74) *Attorney, Agent, or Firm* — Cantor Colburn LLP (57) ABSTRACT

An alternator fan includes a base member having a central hub, an outer peripheral edge, and a web that extends between the central hub and the outer peripheral edge, and a plurality of openings extending through web. A plurality of fan blade elements is arranged in corresponding ones of each of the plurality of openings.

19 Claims, 6 Drawing Sheets

(56) References Cited

U.S. PATENT DOCUMENTS

| | | |
|---|---|---|
| 2011/0316369 A1 | 12/2011 | Neet et al. |
| 2013/0113312 A1 | 5/2013 | Maley |
| 2013/0280086 A1* | 10/2013 | Chou .................... F04D 29/023 416/241 A |
| 2015/0069883 A1 | 3/2015 | Neet et al. |
| 2015/0069884 A1 | 3/2015 | Neet et al. |

OTHER PUBLICATIONS

English language Summary of Office Action issued on Apr. 28, 2016 in related Korean Patent Application No. 10-2015-0030753, 2 pages.

* cited by examiner

ALTERNATOR FAN

BACKGROUND OF THE INVENTION

Exemplary embodiments pertain to the art of electric machines and, more particularly to a fan for an alternator.

Many electric machines include a stator and a rotor. The rotor is rotated relative to the stator to create an electromotive force. In many cases, a fan is mounted to the rotor either directly, or to a rotor shaft. In operation, the rotor spins the fan which, in turn, provides a cooling airflow to the electric machine. Typically, the fan is formed by stamping a fan form from sheet metal. The fan form includes a base portion that is mounted to the rotor integrally formed with a plurality of fan blades. The fan blades, when rotated, create the cooling airflow that is passed through the electric machine for cooling purposes.

BRIEF DESCRIPTION OF THE INVENTION

Disclosed is an alternator fan including a base member having a central hub, an outer peripheral edge, and a web that extends between the central hub and the outer peripheral edge, and a plurality of openings extending through web. A plurality of fan blade elements is arranged in corresponding ones of each of the plurality of openings.

Also disclosed is an alternator including a housing, a stator mounted to the housing, a rotor rotatably mounted relative to the stator within the housing, and an alternator fan fixedly mounted relative to the rotor. The alternator fan includes a base member having a central hub, an outer peripheral edge, and a web that extends between the central hub and the outer peripheral edge, and a plurality of openings extending through web. A plurality of fan blade elements is arranged in corresponding ones of each of the plurality of openings.

Further disclosed is a method of forming an alternator fan including forming a base member including a central hub that extends to an outer peripheral edge through a web having a first surface and an opposing second surface, creating a plurality of openings in the web that extend through the web between the central hub and the outer peripheral edge, and installing a plurality of fan blade elements in corresponding ones of each of the plurality of openings.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
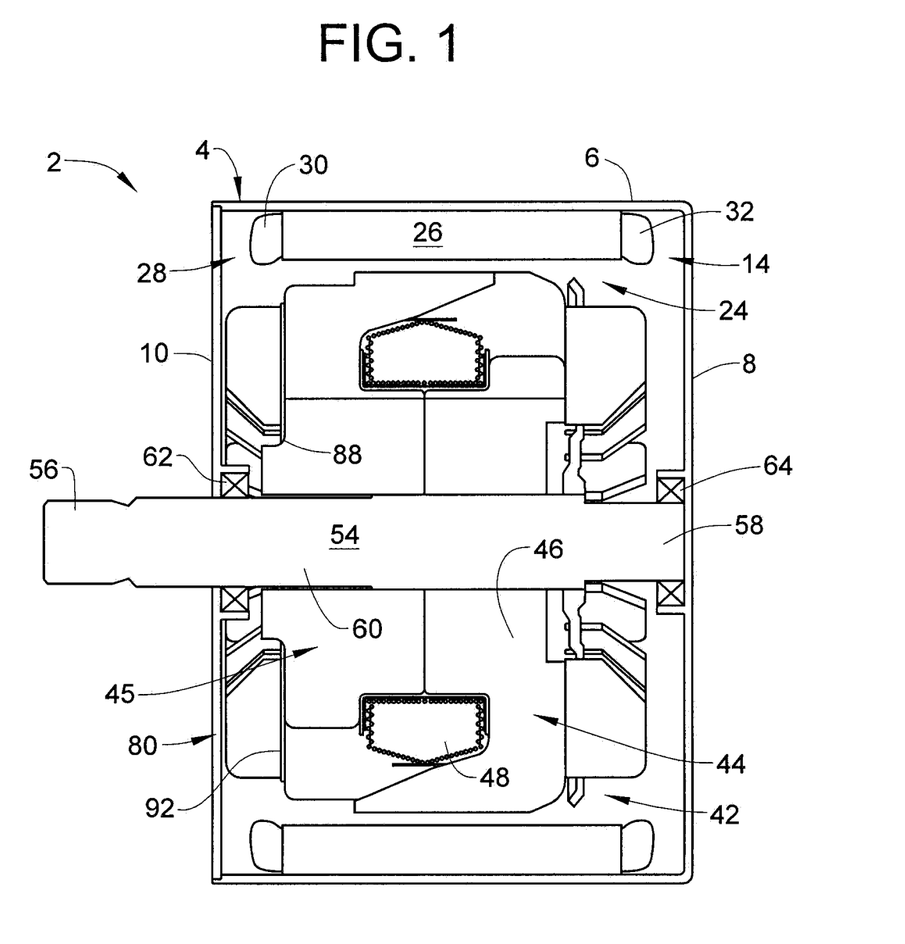
FIG. 1 depicts a cross-sectional side view of an alternator including a fan in accordance with an exemplary embodiment.

An electric machine shown in the form of an alternator, in accordance with an exemplary embodiment, is indicated generally at 2 in FIG. 1. Alternator 2 includes a housing 4 having an outer wall 6, a first end wall 8 and a second end wall 10 that collectively define an interior portion 14. Alternator 2 includes a stator 24 having a stator core 26 that supports a plurality of stator windings 28. Stator windings 28 include a first end turn portion 30 and a second end turn portion 32. Alternator 2 also includes a rotor 42 supported in housing 4 and rotatable relative to stator 24.

Rotor 42 includes a rotor body 44 having a first pole piece 45 and a second pole piece 46 that surround a plurality of rotor windings 48. Rotor body 44 is supported on a shaft 54 that extends from a first end 56 to a second end 58 through an intermediate portion 60. First end 56 is supported at second end wall 10 through a first bearing 62 and second end 58 is supported to first end wall 8 through a second bearing 64. Rotor 42 includes an alternator fan 80 that is mounted to first pole piece 45. Alternator fan 80 may be mounted using a variety of known techniques including an interference fit to shaft 54, staking or welding to first pole piece 45 and the like. Alternator fan 80 rotates with rotor 42 to generate a cooling airflow that passes through interior portion 14.

Figure 2:
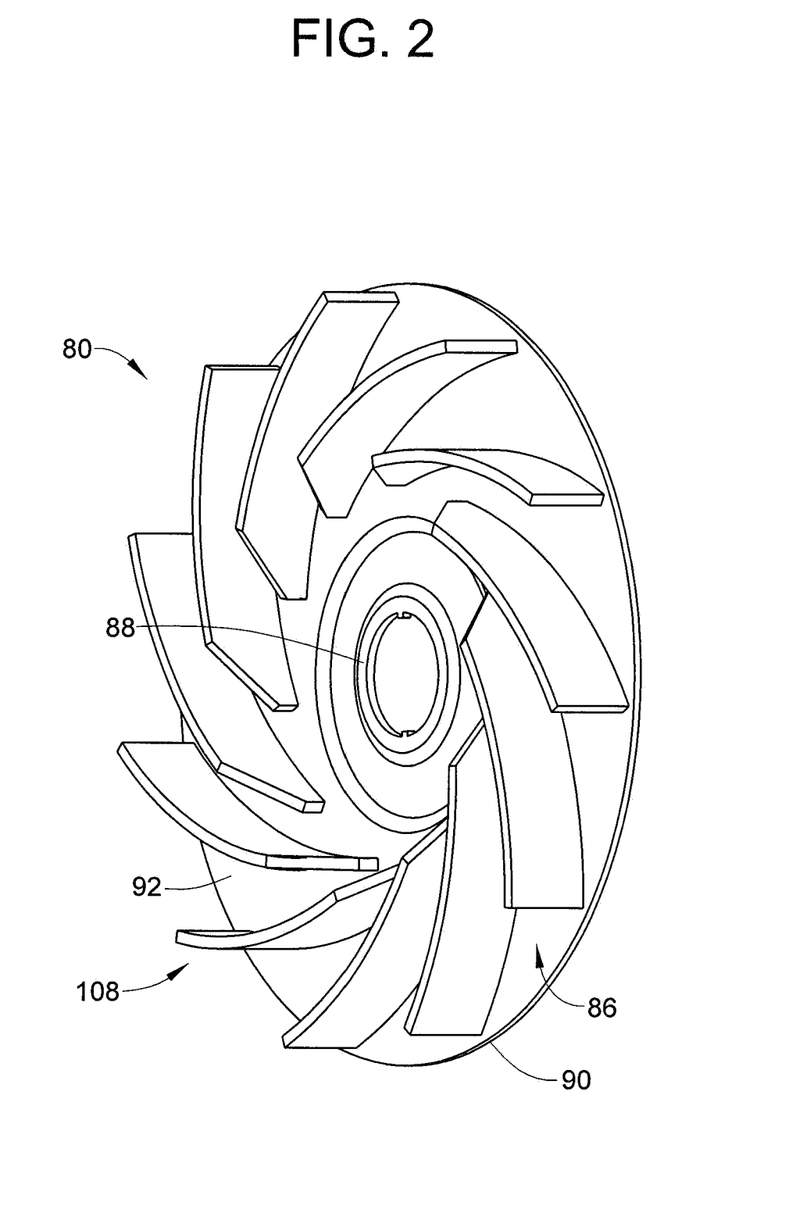
FIG. 2 depicts a perspective view of the fan of FIG. 1.
Figure 3:
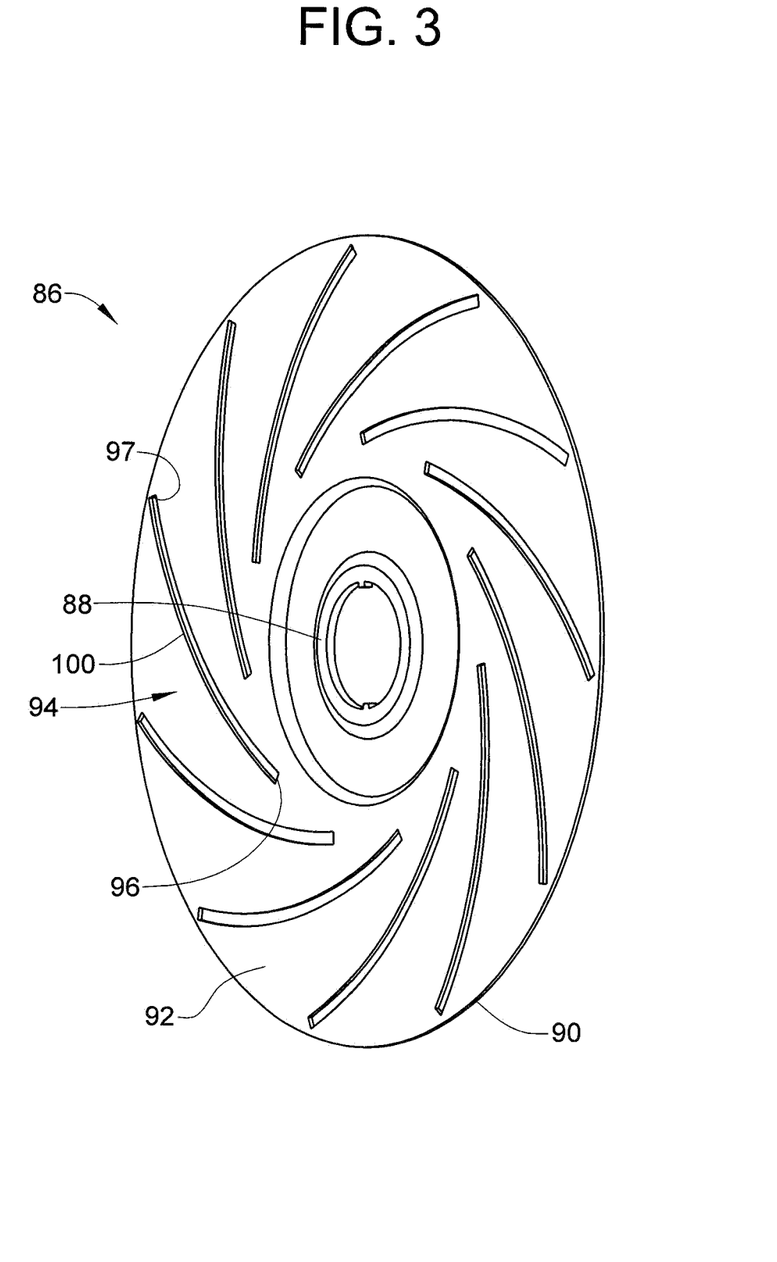
FIG. 3 depicts a perspective view of a base member of the fan of FIG. 2.

In accordance with an exemplary embodiment illustrated in FIG. 2, alternator fan 80 includes a base member 86 that extends from a central hub 88 to an outer peripheral edge 90 through a web 92. As shown in FIG. 3, web 92 includes a plurality of openings 94 that extend from a first end 96 to a second end 97 through an intermediate portion 100. In the exemplary embodiment shown, openings 94 extend generally radially outwardly from central hub 88 along a curvilinear path. However, it should be understood that openings 94 may vary in shape/geometry. Each opening 94 receives a respective one of a plurality of fan blade elements, one of which is indicated at 108.

Figure 4:
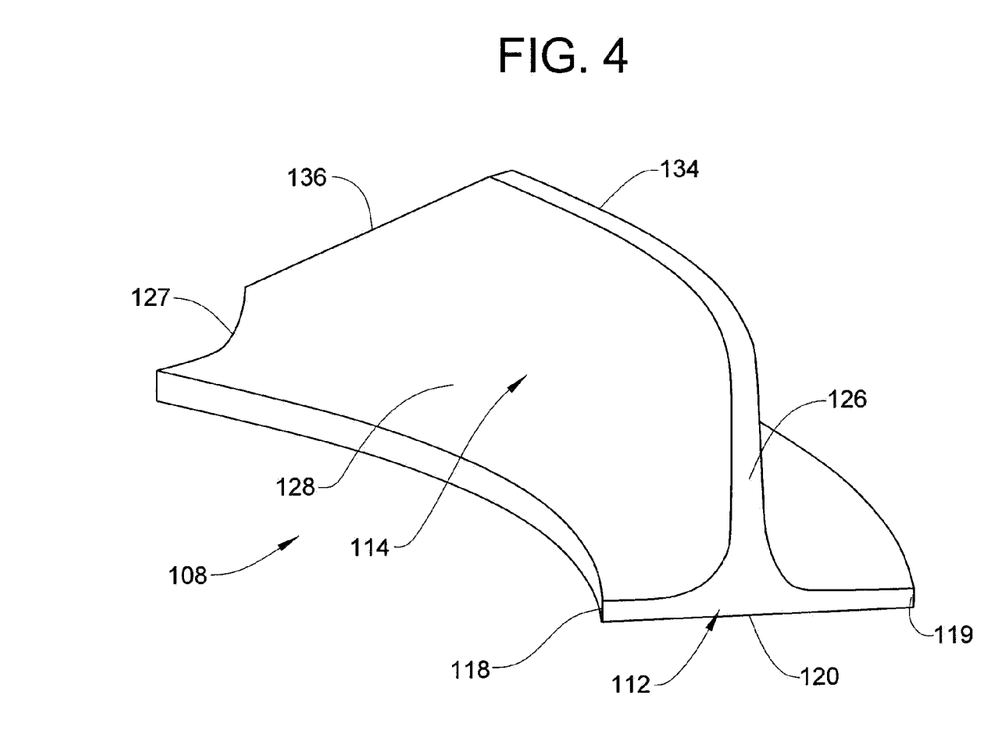
FIG. 4 depicts a perspective view of a fan blade element of the fan of FIG. 2.

As shown in FIG. 4, fan blade element 108, in accordance with an aspect of the exemplary embodiment, includes a base portion 112 and a blade portion 114. Base portion 112 and blade portion 114 are integrally formed through, for example, an extrusion process or a stamping process. Base portion 112 extends from a first end portion 118 to a second end portion 119 through an intermediate portion 120. In the exemplary embodiment shown, base portion 112 extends along a curvilinear path that is substantially similar to opening 94. Blade portion 114 extends from a first end section 126 to a second end section 127 through an intermediate section 128. Blade portion 114 extends generally perpendicularly, and centrally from, base portion 112. Blade portion 114 also includes an outer edge 134 which may have an angled surface 136. Angled surface 136 provides for a desired clearance in housing 4.

Blade portion 114 is inserted into opening 94 until base portion 112 seats or rests against web 92. Blade portion 114 may be sized to possess an interference fit with web 92 of base member 86 or may easily pass through opening 94. Once installed, base member 86 may be attached to first pole piece 45 of rotor 42 by a bonding process such as welding, staking, brazing or similar processes. After bonding, fan blade elements 108 are clamped between base member 86 and first pole piece 45. Alternatively, fan blade element 108 may be secured to base member 86 through a bond such as welding, staking, brazing or other material joining process. After each fan blade element 108 is installed to base member 86, alternator fan 80 is mounted to first pole piece 45. More specifically, first end 56 of shaft 54 passes through central hub 88 until base member 86 rests against first pole piece 45. At this point, alternator fan 80 is secured to rotor body 44 as discussed above.

Figure 5:
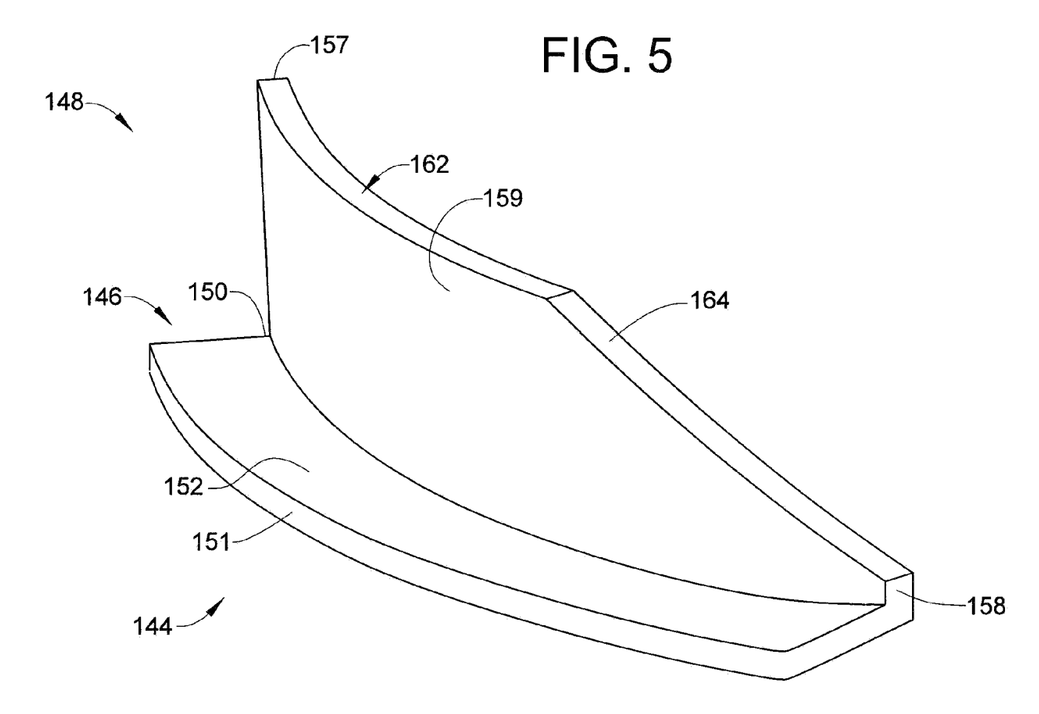
FIG. 5 depicts a perspective view of a fan blade element in accordance with another aspect of the exemplary embodiment.

Reference will now be made to FIG. 5 in describing a fan blade element 144 in accordance with another aspect of the exemplary embodiment. Fan blade element 144 includes a base portion 146 and a blade portion 148. Base portion 146 and blade portion 148 are integrally formed through, for example, an extrusion process or a stamping process. Base portion 146 extends from a first end portion 150 to a second end portion 151 through an intermediate portion 152. Blade portion 148 extends from a first end section 157 to a second end section 158 through an intermediate section 159. Blade portion 148 extends generally perpendicularly from base portion 146. Blade portion 146 also includes an outer edge 162 which may have an angled surface 164, which, in a manner similar to that discussed above, provides for a desired clearance in housing 4.

Figure 6:
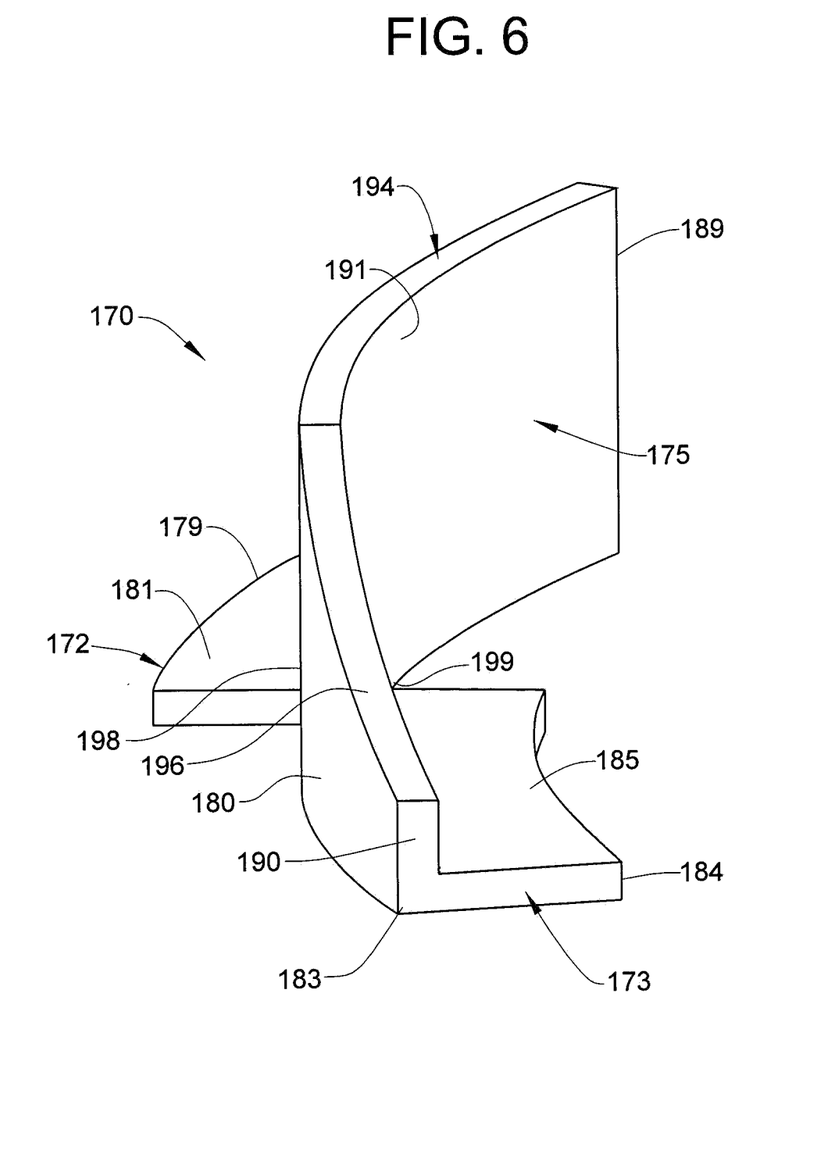
FIG. 6 depicts a perspective view of a fan blade element in accordance with yet another aspect of the exemplary embodiment.

Reference will now be made to FIG. 6 in describing a fan blade element 170 in accordance with yet another aspect of the exemplary embodiment. Fan blade element 170 includes a first base portion 172, a second base portion 173 and a blade portion 175. First base portion 172, second base portion 173 and blade portion 175 are integrally formed through, for example, an extrusion process or a stamping process. First base portion 172 extends from a first end portion 179 to a second end portion 180 through a first intermediate portion 181. Second base portion 173 extends from a first end portion 183 to a second end portion 184 through a second intermediate portion 185.

In the exemplary embodiment shown, first and second base portions 172 and 173 may be curvilinear. Blade portion 175 extends from a first end section 189 to a second end section 190 through an intermediate section 191. First base portion 172 extends, in a first direction, from a first side of blade portion 175 from first end section 189 to an intermediate point 198 of intermediate section 191. Second base portion 173 extends in a second direction, distinct from the first direction, from a second side of blade portion 175 an intermediate point 199 to second end section 190. Blade portion 175 extends generally perpendicularly from second end portion 181 of first base portion 172 and first end portion 185 of second base portion 173. Blade portion 175 also includes an outer edge 194 which may have an angled surface 196, which, in a manner similar to that discussed above, provides for a desired clearance in housing 4.

At this point it should be understood that the exemplary embodiments provide an alternator fan formed by inserting fan blade elements through openings formed in a base portion. Fan blade elements may be joined to the base portion through a metallurgical bond or by simply clamping the base of the fan blade elements between the base portion and the alternator rotor through a variety of known techniques. In addition, the use of extruded and/or stamped flan blade elements facilitates the fabrication of an alternator fan having a fan blade count while also maintaining desired weight and structural integrity. More specifically, in the past, in order to increase fan blade count of a stamped fan, the fan would need to be made through an injection molding process or two stacked steel stampings. The two stacked steel stampings ensure that sufficient material is available for additional blades. However, both processes are costly. In addition, the use of two steal stamping increases an overall weight of the alternator fan. The exemplary embodiment provides a low cost, low weight alternator fan having an increased blade count.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An alternator fan comprising:
   a base member including a central hub, an outer peripheral edge, and a web that extends between the central hub and the outer peripheral edge, and a plurality of openings extending through the web; and
   a plurality of fan blade elements arranged in corresponding ones of each of the plurality of openings, each of the plurality of fan blade elements including a base portion and a blade portion, the base portion extends outwardly of the blade portion at a non-zero angle, wherein the base portion of each of the plurality of fan blade elements rests against the web of the base member.

2. The alternator fan according to claim 1, wherein the plurality of openings extend generally radially outwardly between the central hub and the outer peripheral edge.

3. The alternator fan according to claim 2, wherein each of the plurality of openings extends along a curvilinear path.

4. The alternator fan according to claim 1, wherein the non-zero angle is about 90° relative to the blade portion.

5. The alternator fan according to claim 4, wherein the base portion extends from a first end portion to a second end portion through an intermediate portion and the blade portion extends from a first end section to a second end section through an intermediate section, the intermediate section extending along the intermediate portion being arranged between the first and second end portions.

6. The alternator fan according to claim 5, wherein the blade portion extends outwardly from the base portion at one of the first and second end portions.

7. The alternator fan according to claim 5, wherein the blade portion extends outwardly from the base portion substantially centrally from the intermediate portion.

8. The alternator fan according to claim 4, wherein the base portion includes a first base portion extending outwardly from the blade portion in a first direction and a second base portion extending outwardly from the blade portion in a second direction that is distinct from the first direction.

9. The alternator fan according to claim 4, wherein the base portion is materially integrally formed with the blade portion.

10. An alternator comprising:
    a housing;
    a stator mounted to the housing;
    a rotor rotatably mounted relative to the stator within the housing; and
    an alternator fan fixedly mounted relative to the rotor, the alternator fan including:

a base member including a central hub, an outer peripheral edge, and a web that extends between the central hub and the outer peripheral edge, and a plurality of openings extending through the web; and a plurality of fan blade elements arranged in corresponding ones of each of the plurality of openings, each of the plurality of fan blade elements including a base portion and a blade portion, the base portion extends outwardly of the blade portion at a non-zero angle, wherein the base portion of each of the plurality of fan blade elements rests against the web of the base member.

11. The alternator according to claim 10, wherein the plurality of openings extend generally radially outwardly between the central hub and the outer peripheral edge.

12. The alternator according to claim 10, wherein the non-zero angle is about 90° relative to the blade portion.

13. The alternator according to claim 12, wherein the base portion extends from a first end portion to a second end portion through an intermediate portion and the blade portion extends from a first end section to a second end section through an intermediate section, the intermediate section extending along the intermediate portion being arranged between the first and second end portions.

14. The alternator according to claim 13, wherein the blade portion extends outwardly from the base portion at one of the first and second end portions.

15. The alternator according to claim 13, wherein the blade portion extends outwardly from the base portion substantially centrally from the intermediate portion.

16. The alternator according to claim 12, wherein the base portion includes a first base portion extending outwardly from the blade portion in a first direction and a second base portion extending outwardly from the blade portion in a second direction that is distinct from the first direction.

17. The alternator according to claim 12, wherein the base portion is materially integrally formed with the blade portion.

18. The alternator according to claim 12, wherein the rotor includes a pole piece, the base portion being clamped between the pole piece and the base member.

19. The alternator according to claim 12, wherein the each of the plurality of fan blade elements is secured to the base member through an interference fit.

* * * * *